US010956387B2

(12) United States Patent
Cong et al.

(10) Patent No.: US 10,956,387 B2
(45) Date of Patent: Mar. 23, 2021

(54) ACCESSING HISTORICAL CONTENT ITEMS OF A CONTENT MANAGEMENT SYSTEM THROUGH PLACEHOLDERS

(71) Applicant: Dropbox, Inc., San Francisco, CA (US)

(72) Inventors: Shi Cong, Sammamish, WA (US); Tony Xu, Redmond, WA (US)

(73) Assignee: Dropbox, Inc., San Francisco, CA (US)

( * ) Notice: Subject to any disclaimer, the term of this patent is extended or adjusted under 35 U.S.C. 154(b) by 191 days.

(21) Appl. No.: 15/395,238

(22) Filed: Dec. 30, 2016

(65) Prior Publication Data
US 2018/0189334 A1 Jul. 5, 2018

(51) Int. Cl.
G06F 16/21 (2019.01)
G06F 16/93 (2019.01)
G06F 16/22 (2019.01)
G06F 16/2458 (2019.01)

(52) U.S. Cl.
CPC .......... *G06F 16/219* (2019.01); *G06F 16/22* (2019.01); *G06F 16/2474* (2019.01); *G06F 16/94* (2019.01)

(58) Field of Classification Search
CPC ......... G06F 17/30309; G06F 17/30014; G06F 17/30548; G06F 17/30312; G06F 16/219; G06F 16/94; G06F 16/2474; G06F 16/22; G06F 16/21; G06F 16/93; G06F 16/2458
See application file for complete search history.

(56) References Cited

U.S. PATENT DOCUMENTS

| 7,013,299 | B1 * | 3/2006 | Sherwood | G06F 16/219 |
| 7,529,778 | B1 * | 5/2009 | Dewey | G06F 11/1451 |
| 8,244,678 | B1 | 8/2012 | Hartland et al. | |
| 9,483,364 | B2 | 11/2016 | Gokhale et al. | |
| 2005/0187992 | A1 * | 8/2005 | Prahlad | G06F 11/1435 |
| 2008/0034019 | A1 | 2/2008 | Cisler et al. | |
| 2008/0307000 | A1 * | 12/2008 | Paterson | G06F 3/0484 |
| 2010/0306171 | A1 * | 12/2010 | Antos | G06F 11/1448 707/638 |

(Continued)

OTHER PUBLICATIONS

Eassos, How to—Recover files from formatted hard drive or partition, (https://web.archive.org/web/20130105134331/https://www.eassos.com/how-to/recover-files-from-formatted-hard-drive-partition.php published on Jan. 5, 2013 (Year: 2013).*

(Continued)

*Primary Examiner* — Aleksandr Kerzhner
*Assistant Examiner* — Maher N Algibhah
(74) *Attorney, Agent, or Firm* — Polsinelli PC

(57) ABSTRACT

The present technology provides an interface and system for generating a previous version of a directory structure that can be useful in the restoration of a directory or file. The system, methods and non-transitory computer-readable storage media include receiving a request for a previous version of a directory structure at an indicated date, querying a content management system for placeholder content items associated with the previous version of the directory structure at the indicated date, receiving the placeholder content items, and generating a read-only copy of at least a portion of the previous version of the directory structure at the indicated date based on the placeholder content items, wherein the read-only copy of the directory structure is separate from the directory structure at a current date.

20 Claims, 7 Drawing Sheets

(56) References Cited

U.S. PATENT DOCUMENTS

| | | | | |
|---|---|---|---|---|
| 2010/0325533 A1* | 12/2010 | Artz | ............... | G06F 16/9577 |
| | | | | 715/235 |
| 2011/0010664 A1* | 1/2011 | Das | ............... | G06F 11/32 |
| | | | | 715/810 |
| 2012/0158689 A1* | 6/2012 | Doshi | ............... | G06F 11/1446 |
| | | | | 707/706 |
| 2013/0290301 A1* | 10/2013 | Victor | ............... | G06F 16/13 |
| | | | | 707/722 |
| 2014/0258239 A1* | 9/2014 | Amlekar | ............... | G06F 11/1402 |
| | | | | 707/649 |
| 2014/0280495 A1 | 9/2014 | Schwartz | | |
| 2016/0224550 A1* | 8/2016 | Morris | ............... | G06F 16/1873 |
| 2017/0124345 A1* | 5/2017 | Christiansen | ..... | G06F 17/30233 |

OTHER PUBLICATIONS

Jeff Reifman, "Build a Private Dropbox With Time Machine Backup Using BitTorrent Sync," EnvatoTuts, Melbourne, Australia, May 30, 2016 (Downloaded Dec. 12, 2016 from https://code.tutsplus.com/tutorials/build-a-private-dropbox-with-time-machine-backup-using-bittorrent-sync--cms-23918).

PCT Search Report and Written Opinion dated Dec. 14, 2017 in related PCT Application No. PCT/US2017/060351, filed on Nov. 7, 2017, Applicant: Dropbox, Inc., 17 pages.

First Examination Report for Australian Application No. 2017385015, dated Sep. 18, 2019, 2 pages.

Notification of Reason for Refusal for Japanese Application No. 2019513807 dated Jul. 27, 2020, 7 pages.

* cited by examiner

US 10,956,387 B2

ACCESSING HISTORICAL CONTENT ITEMS OF A CONTENT MANAGEMENT SYSTEM THROUGH PLACEHOLDERS

TECHNICAL FIELD

The present technology pertains to content items stored at a content management system, and more specifically pertains to retrieving historical content items that were at one time stored at the content management system.

BACKGROUND

Content items stored in an online storage account associated with a content management system can be accessed, via a network, by one or more client device. The content management system can include a server file journal for recording data regarding changes, access, etc. to the content items. In certain situations, a content item could include unwanted changes or have been deleted. For example, a user could have (intentionally or unintentionally) deleted a content item. In other examples a user could have (intentionally or unintentionally) saved unwanted edits. In some examples, a user could have made changes (e.g., edits or deletes) that are unwanted by a different user with shared access to the content item. In some examples, a user simply needs to access historical data for legal, business, or personal reasons. In these situations, the user would want to recover the accidental deletion or edits and/or access past data by restoring the content items to a point in time prior to the accidental deletion or edits.

Current systems enable a user to roll-back their online storage account (and the associated content items) to a specific point in time. However, the roll-back does not preserve any changes to content items subsequent the specific point in time, and is an "all-or-nothing" approach to accessing historical content items (e.g., a user must roll-back the entire online storage account/directory structure). A system to enable continued access to the current-in-time online storage account, while enabling access to a specific point in time is desired.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for accessing (e.g., viewing, copying, saving, etc.) content items stored with a content management system at a previous point in time, while retaining access to the current-in-time version of the content items. A user can store a large quantity of content items at their online storage account associated with a content management system. In some situations, a user can modify (e.g., remove or alter) content items stored at the content management system and later want to return to a previous version of the content item. By using a client application, the user can enter a date (e.g., timestamp) the user believes to be associated with a desired version of the modified content items. The client application can then generate a previous version of the user's account (e.g., namespace/directory structure) with placeholder content items that the user can navigate, and retrieve (on-demand) previous versions of the content items reflecting the version of the content items at the point in time of the entered date. The previous version of the user's account can include the full namespace (e.g., directory structure) or can include a sub-set of the namespace. In some examples, the previous version of the user's account can be a shared namespace. A shared namespace can be one or more content items of a first user's account who has provided access to a second user. For example, User B can share one or more content items from User B's user account with User A. User A can generate a previous version of User B's user account that User A has been provided access.

There are several advantages of using placeholder content items to generate a previous version of a user's online account (and associated content items). Placeholder content items are smaller in size than complete content items and can enable a user to access previous versions of their accounts without utilizing excessive space on the user's local machine. A user can access multiple previous versions of the user's account at the same time. When accessing one or multiple previous version of the user's account, there is also no unnecessary bandwidth utilization. For example, placeholder items are initially generated, and the complete content items are downloaded when accessed, not during the generation of the previous version of the user's account.

Figure 1:
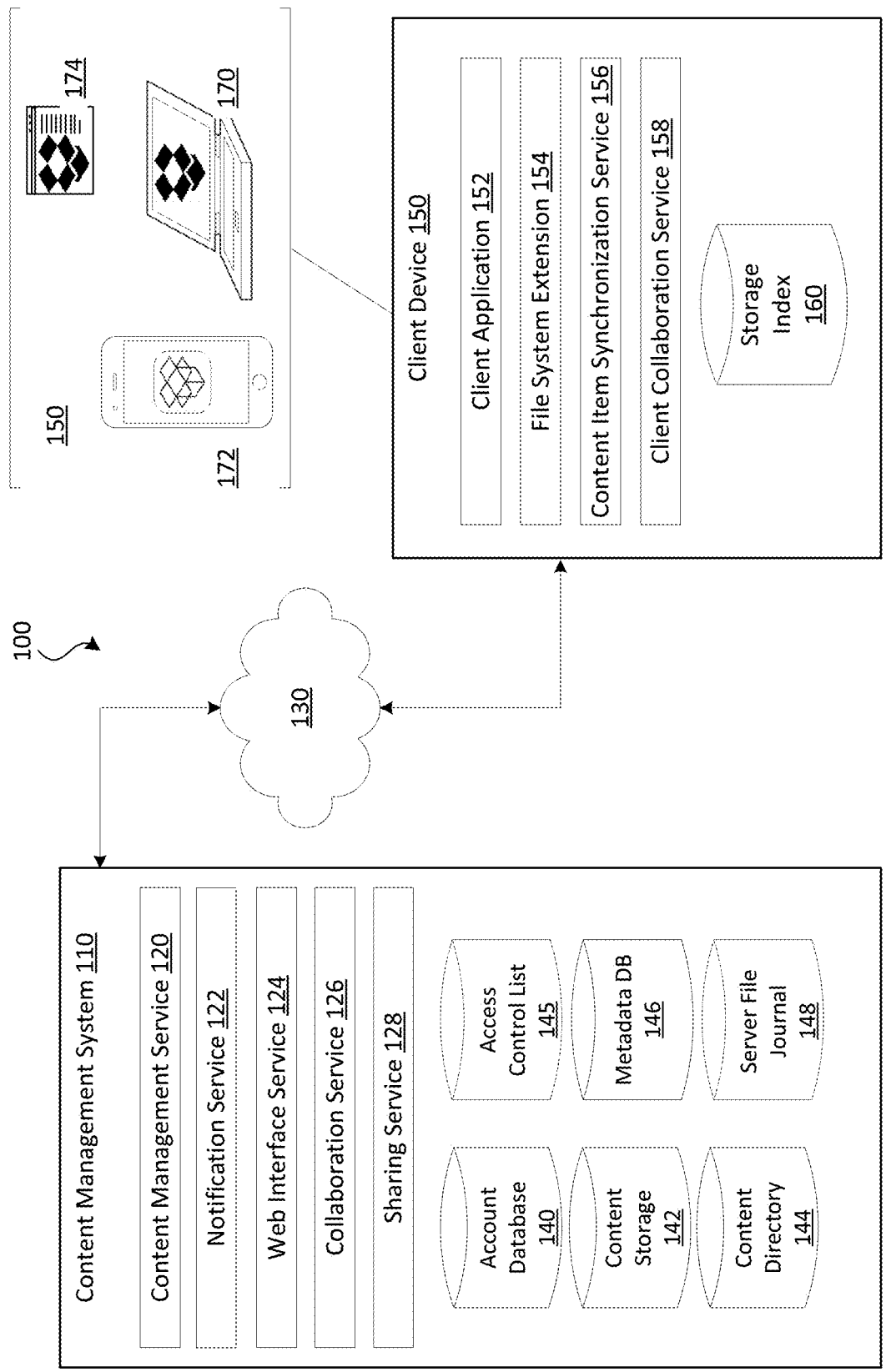
FIG. 1 shows an example of a content management system and client devices.

In some embodiments the disclosed technology is deployed in the context of a content management system having content item synchronization capabilities and collaboration features, among others. An example of a system configuration 100 is shown in FIG. 1, which includes content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices via a communication network 130 (e.g., the Internet; telephone data networks, including 3G, LTE, etc.; wide area networks; local area network; virtual networks, wireless networks, etc.).

Content management system 110 supports a plurality of accounts. An entity (user, group of users, company, etc.) can create an account with content management system, and account details can be stored in account database 140. Account database 140 can store profile information for registered entities. In some cases, profile information for a registered entity can include a username and/or email address. Account database 140 can include account management information, such as account type (e.g., various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of a group can inherit the permissions. For example, a marketing group can have access to one set of content items while an engineering group can have access to another set of content items. An administrator of a group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 can be combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 120, which includes software or other processor executable instructions for managing the storage of content items including, but not limited to, receiving content items for storage, preparing content items for storage, selecting a storage location for the content item, retrieving content items from storage, etc. In some embodiments, content management service 120 can divide a content item into smaller blocks of data for storage at content storage 142. The location of each data block making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can recognize content item duplicates as such since the deterministic hash function will generally output the same identifier for every copy of the same content item, but will output a different identifier for a different content item. Using this methodology, content management service 120 can output a unique ID for each content item.

Content management service 120 can also designate or record a content path for a content item. The content path can include the name of the content item and/or folder hierarchy associated with the content item. For example, the content path can include a folder or path of folders in which the content item is stored in a local file system on a client device. Content management service 120 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 120 can define or record a content path for a content item wherein the "root" node of a directory structure can be a namespace for each account. Within the namespace can be a directory structure defined by a user of an account and/or content management service 120. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure can be a comfortable navigation structure for users, but does not necessarily correlate to storage locations of content items in content storage 142.

While the directory structure in which an account views content items does not necessarily correlate to storage locations at content management system 110, the directory structure can generally correlate to storage locations on client device 150 depending on the file system used by client device 150.

As addressed above, a content entry in content directory 144 can also include the location of each block of data making up a content item. More specifically, the content entry can include content pointers that identify the location in content storage 142 of the data blocks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 120 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 120 can also store metadata describing content items, content item types, folders, file path, time stamps, sizes, attributes, and/or the relationship of content items to various accounts, collections, or groups in metadata database 146, in association with the unique ID of the content item.

Content management service 120 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control service that tracks changes to content items, different versions of content items (including diverging version trees), and a change history that can be acquired from the server file journal 148. The change history can include a set of changes that, when applied to the original content item version, produces the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications executing on the device. Client device 172 is a computing device in which content items may only be accessible to a specific application or by permission given by the specific application, and the content items can be stored in an application specific space and/or in a remote network. Client device 174 is any client device accessing content management system 110 via a web browser and accessing content items via a web interface. While example client devices 170, 172, and 174 are depicted in form factors such as a laptop, mobile device, or web browser, it should be understood that these descriptions do not limit clients devices to these form factors. For example, a mobile device, such as client device 172, may have a local file system accessible by multiple applications executing on the device, or client device 172 may access content management system 110 via a web browser. As such, the form factor should not be considered limiting when considering client device 150's capabilities. One or more functions described in this disclosure with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 120 to synchronize changes to content items between client device 150 and content management system 110.

Client device 150 can synchronize content with content management system 110 via content synchronization service 156. The synchronization can be platform agnostic. That is, content can be synchronized across multiple client devices of varying types, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments in which client device 150 initiates synchronization of content items with content management system 110, a user can manipulate content items directly from the file system of client device 150, while file system extension 154 (which can be integrated with the local file system, or even the operating system kernel) can intercept read, write, copy, move, delete commands relative to content items in the designated location of the file system of client device 150.

When file system extension 154 detects a write, move, copy, or delete command, it can notify content item synchronization service 156, which can synchronize the changes to content management system service 120. In some embodiments, content item synchronization service 156 can perform some functions of content management system service 120 including functions addressed above such as dividing a content item into blocks, hashing the content item to generate a unique identifier, etc. Content synchronization service 156 can index content within client storage index 160 and save the result in storage index 160. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 160 to facilitate the synchronization of at least a portion of the content within client storage with content associated with a user account on content management system 110. For example, content synchronization service 156 can compare storage index 160 with content management system 110 and detect differences between content on client storage and content associated with a user account on content management system 110. Content synchronization service 156 can then attempt to reconcile differences by uploading, downloading, modifying, and/or deleting content on client storage as appropriate. Content management service 120 can store the changed or new block for the content item and update server file journal 148, metadata database 146, content directory 144, content storage 142, account database 140, etc., as appropriate.

When synchronizing content from content management system 110 to client device 150, a modification, addition, deletion, and/or move of a content item recorded in server file journal 148 can trigger delivery of a notification to client device 150 using notification service 122. When client device 150 receives the notification of the change to server file journal 148, client device 150 can check storage index 160 to determine if the time stamp of the change occurred since the last synchronization, or determine if the specific change has been synchronized. When client device 150 determines that it is out of synchronization with content management system 110, content item synchronization service 156 can request content item blocks including the changes, and client device 150 can update its local copy of the changed content items. In some embodiments, notification service 122 can query other services or databases of content management system 110, such as server file journal 148, to gain more context for the notification, to determine if a notification can be batched with another notification, or to supplement a notification, etc.

Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and improve performance of client device 150 and content management system 110 by reducing the processing, memory, storage, and network resources that would otherwise be consumed by synchronizing all content.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing of content via sharing service 128. Accounts of content management system 110 can share content with one another by providing a link to the content. Sharing service 128 can then provide access to the shared content item from any computing device in network communication with content management system 110. However, in some embodiments, a link can be associated with access restrictions enforced by content management system 110. Sharing service 128 can also facilitate indirect sharing of content within content management system 110 by enabling an account to share shared content with at least one additional user account (in addition to the original user account associated with the content item) so that each user account has access to the content item. The additional user account can gain access to the content by accepting the content, which will then be accessible through web interface service 124 or the directory structure associated with the additional user's account on client device 150. The sharing can be performed in a platform agnostic manner. That is, the content can be shared across multiple client devices 150 of varying types, capabilities, operating systems, etc. The content can also be shared across varying types of user accounts.

To share a content item within content management system 110, sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 may generate a custom network address, such as a uniform resource locator (URL), which can allow any web browser to access the content item or collection in content management system 110 without authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110. Content management system 110 can then use the received content identification data to identify the appropriate content item and return the content item.

In addition to generating the URL, sharing service 128 can also record the URL, or that the URL exists, in access control list database 145. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from within a specified domain, e.g., from within a corporate network domain, or by accounts associated with a specified domain, e.g., accounts associated with a company account (e.g., @acme.com).

In some embodiments, sharing service 128 can also deactivate a generated URL or otherwise unshare a content item. For example, each content entry can also include an active sharing flag indicating whether the content is still shared, and sharing service 128 may only return a requested content item if the active sharing flag is set to 1 or true. Thus, access to a previously shared content item can be restricted by changing the value of the active sharing flag. This can allow a user to restrict access to the shared content item without having to move the content item, delete the generated URL, etc. Likewise, sharing service 128 can reactivate sharing by again changing the value of the active sharing flag to 1 or true. A user can thus easily restore access to the content item without the need to generate a new sharing mechanism, e.g., a new URL.

In some embodiments, content management system 110 can designate a location, such as a URL, for uploading a content item. For example, a first user account can request an upload location from sharing service 128, and provide the upload location to a second user account (or other user in some cases). The second user account or other user can upload a content item to the first user account using the upload location.

Monitoring Interactions with Shared Content Items

In some embodiments, content management system 110 can provide information about user interactions with a shared content item. In some embodiments, content management system 110 can report that a user is currently viewing the shared content item. For example, client collaboration service 158 can request notifications service 122 to send notifications to other client devices having access to the shared content item when any one client device accesses the shared content item. Notifications service 122 can then notify all client devices regarding access to the shared content item by the one client device. In some embodiments, the interaction data can also serve as a proxy for the presence of a user owning and/or operating the one client device.

In some embodiments, content management system 110 can report a history of user interactions with a shared content item. Collaboration service 126 can query data sources such as metadata database 146 and server file journal 148 to determine that a user account has saved the content item, that a user account has yet to access the content item, etc., and disseminate this information using notification service 122 to other user accounts to determine which user accounts have (or have not) interacted with the shared content item.

In some embodiments, collaboration service 126 can facilitate commenting associated with content, even if a content item does not natively support commenting functionality. Such comments can be stored in metadata database 146.

In some embodiments, collaboration service 126 can originate and transmit notifications for users. For example, a first user can mention a second user in a comment and collaboration service 126 can send a notification to the second user that he has been mentioned in the comment. Various other content item events can trigger notifications, including deleting a content item, sharing a content item, etc.

In general, collaboration service 126 can provide a messaging platform whereby users can send and receive instant messages, voice calls, emails, etc.

Collaboration Content Items

Collaboration service 126 can also provide an interactive content item collaboration platform in which users can simultaneously make changes to collaboration content items, provide comments regarding the collaboration content items, manage tasks associated with the collaboration content items, etc. These collaboration content items can be files that user accounts can create and edit using a content item editor, and can contain elements for enabling collaboration. These collaboration elements may include a collaboration identifier, one or more author and/or editor identifiers, collaboration text, collaboration attributes, interaction information, comments, sharing users, etc. The collaboration elements can be stored in a database entity to allow for search and retrieval of the collaboration content items. Multiple user accounts may access, view, edit, and otherwise collaborate on collaboration content items at the same time or at different times. In some embodiments, this can be managed through a web interface that enables two users to work on the same copy of a collaboration content item at the same time.

Collaboration Companion Interface

In some embodiments client collaboration service 158 can provide a native application companion interface for the purpose of displaying information relevant to a content item being presented on client device 150. In some embodiments, a certain content item is accessed by a native application stored and executed on client device 150, where the content item is in a designated location of the file system of client device 150 such that the content item is managed by client application 152, the native application may not provide any native way to display the above addressed collaboration data addressed above. In such embodiments, client collaboration service 158 can detect that a user has opened a content item, and can provide an overlay with additional information for the content item, such as the collaboration data. For example, the additional information can include comments for the content item, a status of the content item, interactions with the content item by other users, etc. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user account. For example, a software package, such as an application running on client device 150, can programmatically make API calls directly to content management system 110 when a user account provides authentication credentials, to read, write, create, delete, share, or otherwise manipulate content.

A user can utilize a user account to view or manipulate content using a web interface generated and served by web interface service 124. For example, the user can navigate in a web browser to a web address associated with the user account provided by content management system 110. Changes or updates to content in content storage 142 made through web interface service 124, such as uploading a new version of a content item, can be propagated back to other client devices associated with the user account. For example, multiple client devices, each with their own client software, can be associated with a single account and content items in the account can be synchronized between each of the multiple client devices.

Client device 150 can connect to content management system 110 on behalf of a user account. A user of the user account can directly interact with client device 150, for example when client device 150 is a desktop or laptop computer, phone, television, internet-of-things device, etc. Alternatively or additionally, client device 150 can act on behalf of the user account without the user having physical access to client device 150, for example when client device 150 is a server.

Some features of client device 150 are enabled by an application installed on client device 150. In some embodiments, the application can include a content management system specific component. For example, the content management system specific component can be a client application 152 (e.g., stand-alone application), one or more application plug-ins, and/or a browser extension. However, the user can also interact with content management system 110 via a third-party application, such as a web browser, word processor, spreadsheet program, presentation program, source code control tool, etc. that resides on client device 150 and is capable of communicating with content management system 110. In various implementations, client application 152 can present a user interface (UI) for a user to interact with content management system 110. For example, the user can interact with the content management system 110 via file system extension 154 integrated with the file system or via a webpage displayed using a web browser application.

In some embodiments, client application 152 can manage and synchronize content for more than one account of content management system 110. In such embodiments, client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While this disclosure presents content management system 110 with specific components, it will be understood by one skilled in the art, that the architectural configuration of system 100 is simply one possible configuration and that other configurations with more or fewer components are possible. Further, a service can have more or less functionality, even including functionality described as being associated with another service. Moreover, features described in this disclosure with respect to a particular embodiment can be combined with features described with respect to another embodiment.

While system 100 is presented with specific components, it will be understood by one skilled in the art, that the architectural configuration of system 100 is simply one possible configuration and that other configurations with more or fewer components are possible.

Figure 2:
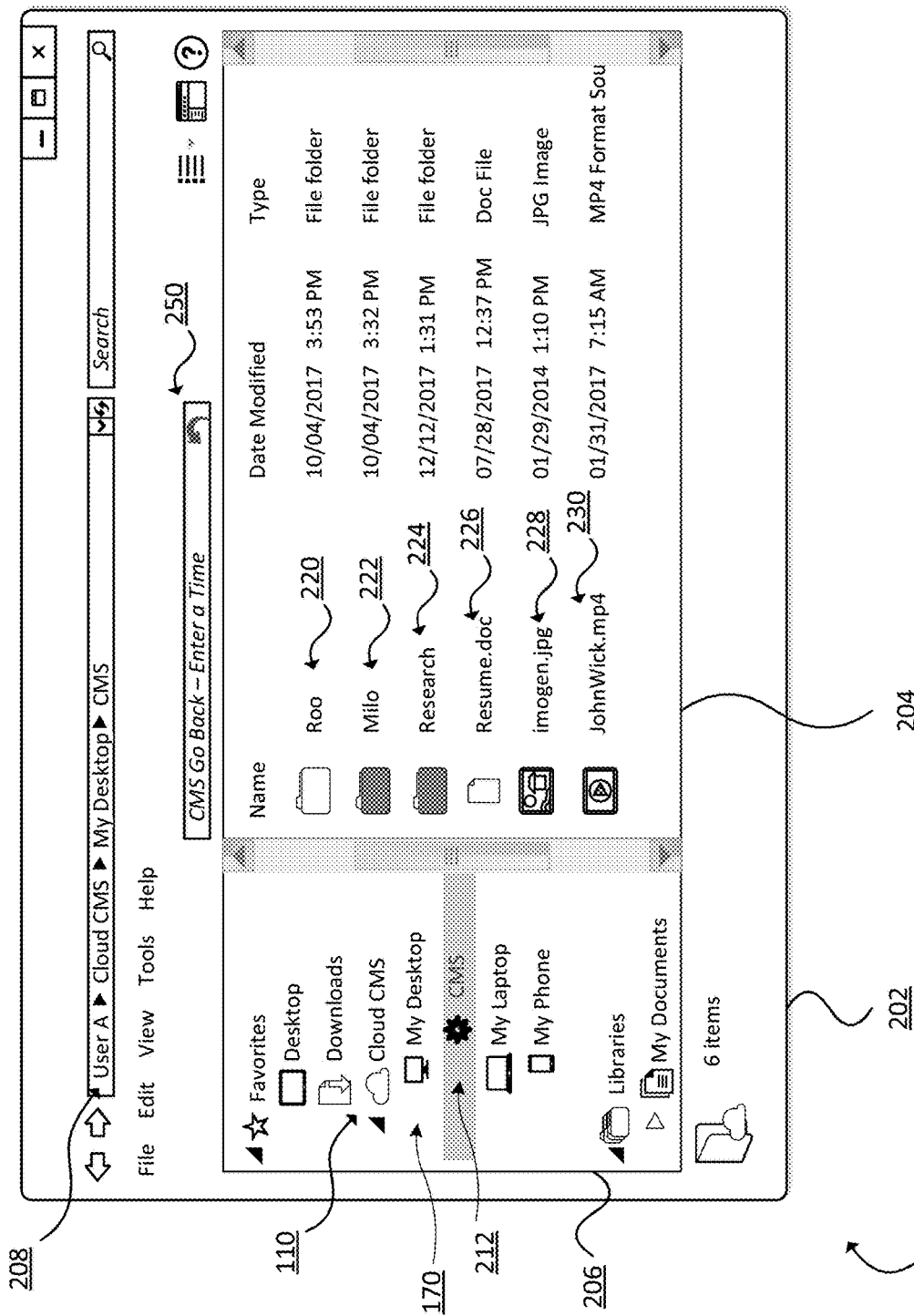
FIG. 2 shows an example client interface of content items stored at a content management system at a current time.

FIG. 2 shows an example client application interface 200 of content items stored at a content management system (e.g., content management system 110 of FIG. 1) at a current time (e.g., present time). Client application interface 200 can be part of client application 202 installed on client device 150 to interact with content management system 110. Client application 202 can be integrated into a file system of client device 150 or can be implemented as a stand-alone application. In the example of FIG. 2, user 208 (e.g., User A) of a user account associated with the content management system operates client application 202 on client device 170, the user's desktop computer (as shown in navigation pane 206). Client application 202 can include detail pane 204 that lists content items stored at the user account 212 (e.g., User A's CMS account). For example, detail pane 204 can list the content items stored locally (at user's desktop 170) and synchronized to the content management system (e.g., content management system 110). The detail pane can at least include the name of the content item (e.g., Roo 220, Milo 222, Research 224, Resume.doc 226, imogen.jpg 228, JohnWick.mp4 230), date content item was modified, and type of content item (folder, document, image, video, etc.).

Figure 4:
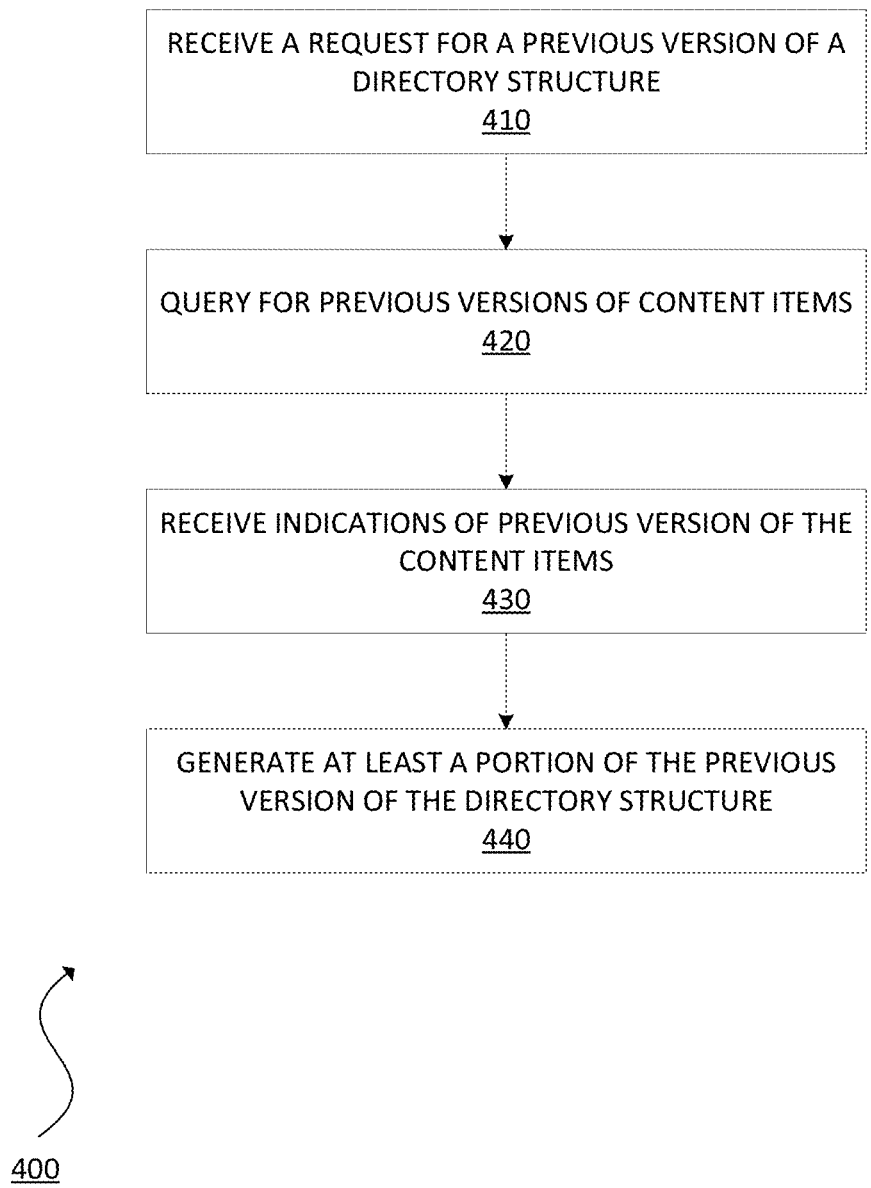
FIG. 4 shows a flow diagram of an example method for generating a previous directory structure of content items stored at a content management system.

Still referring to FIG. 2, client application 202 can be current in time. For example, client application 202 can include the most recent modifications, additions, and deletions of content items from the user account (e.g., User A's CMS). Client application 202 can include a "go back" pane 250. The "go back" pane can enable the user to enter a date (e.g., timestamp), previous to the current time and/or date, for viewing previous versions of the content items stored at the user's account at the content management system (as shown in FIG. 4). The date can be entered in a variety of ways, including but not limited to: manual entry by the user, selecting from a calendar, selection of specific dates provided to the user, selecting from a generated list of important dates where the content item (e.g., file, directory, etc.) went through non-trivial updates, etc. The date can be in a variety of formats, including but not limited to: any combination of year, day, and month; month and year; etc.

Figure 3A:
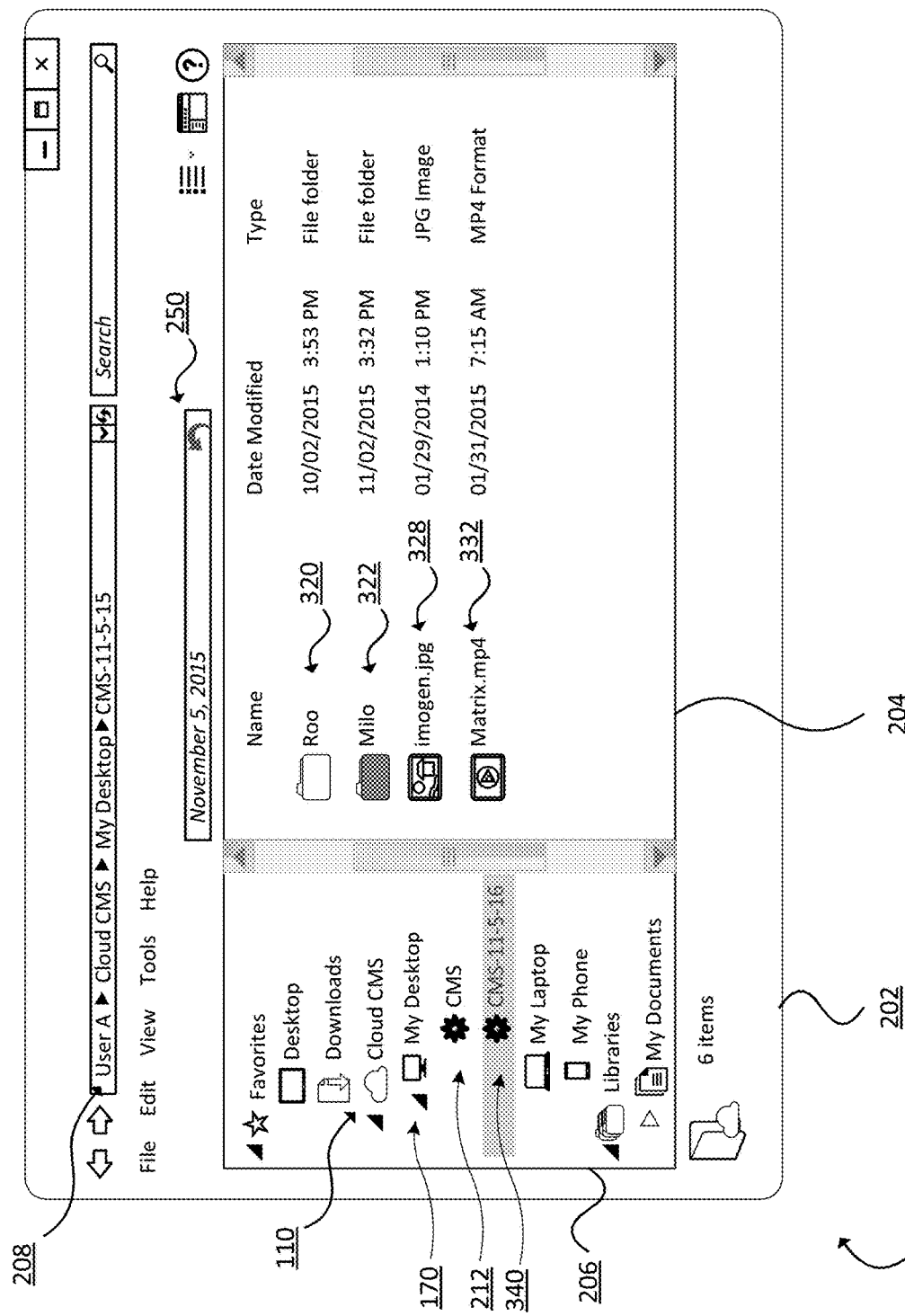
FIGS. 3A and 3B show an example client interface of content items stored at a content management system at a previous time.
Figure 3B:
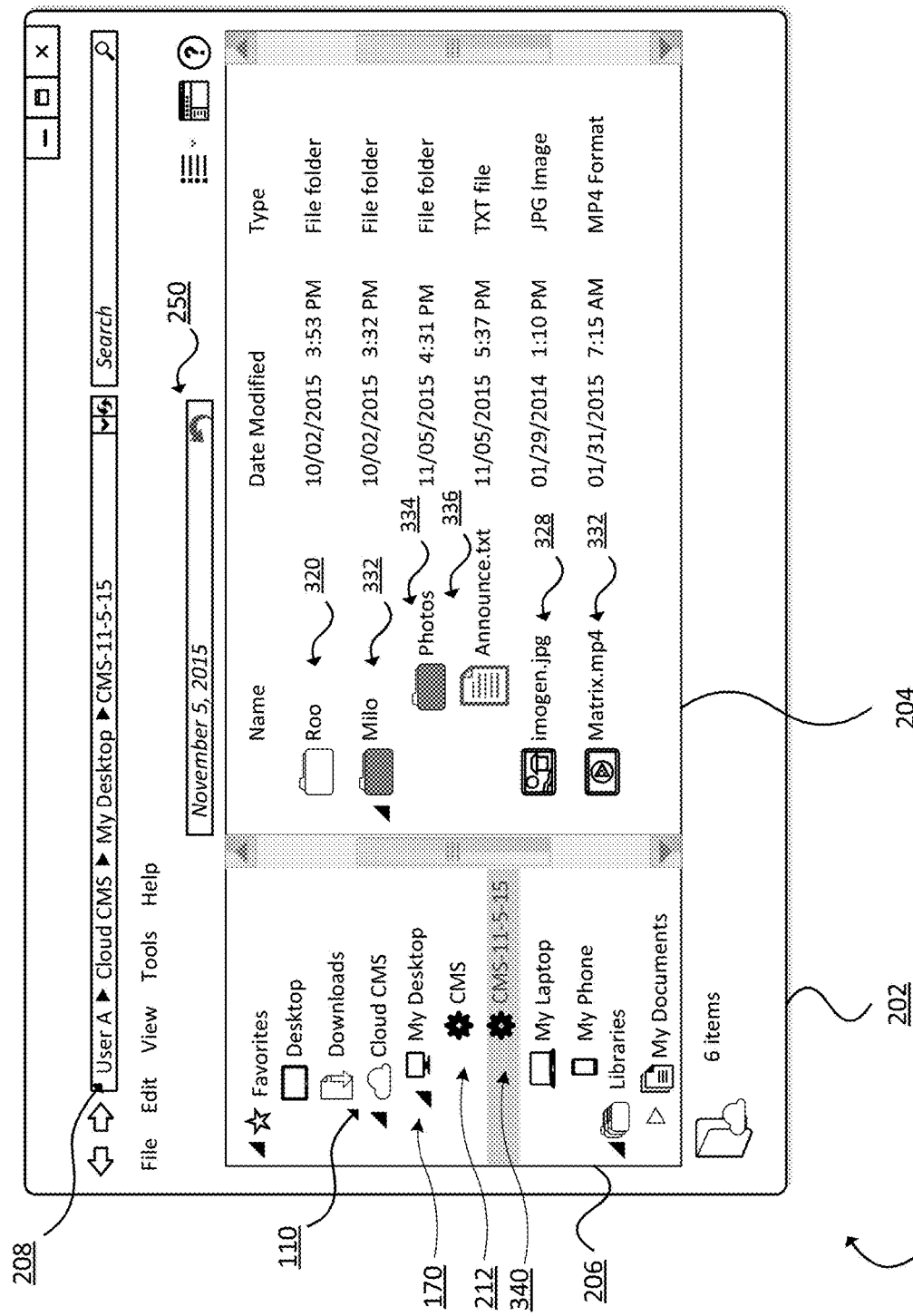

FIGS. 3A and 3B show example client application interfaces 300 and 350 of content items stored at a content management system (e.g., content management system 110 of FIG. 1) at a previous time (e.g., Nov. 5, 2016). Referring to FIG. 3A, after a user has entered a date into "go back" pane 250 (e.g., Nov. 5, 2015) a previous version of User A's user account (e.g., namespace, directory structure, etc.) can be generated (e.g., by using placeholder content items as addressed with respect to FIG. 4 and FIG. 5). For example, user account 340 (e.g., CMS-11-5-15) can be created as shown in navigation pane 206. The detail pane 204 can list content items of the previous version at the entered time (e.g., Nov. 5, 2016). For example, the most recently modified version prior to the "go back" date entered by the user (e.g., Nov. 5, 2015). For example, folder 320 (e.g., Roo) was modified last (before Nov. 5, 2015) on Oct. 2, 2015. In user account 212 (e.g., User's A CMS), folder 320 (e.g., Roo) was most recently modified on Oct. 4, 2017 (as shown in FIG. 2).

Still referring to FIG. 3A, video file 332 (e.g., Matrix.mp4) was stored at user's account prior to Nov. 5, 2015, but subsequently deleted before the current-in-time user account (as shown in FIG. 2). Folder 224 (e.g., Research), document 226 (e.g., Resume.doc), image 228 (imogen.jpg), and video 230 (e.g., JohnWick.mp4) were all stored at user's account subsequent to Nov. 5, 2015, since the content items are not listed in FIG. 3A, but are listed in current-in-time user account of FIG. 2. Referring now to FIG. 3B, folder 332 (e.g., Milo) can be expanded to show the underlying content items (e.g., folder 334 and text file 336). The underlying content items can be placeholder content items generated at the time of creation of the previous version of the directory structure of content items or generated when folder 332 (e.g., Milo) was accessed. The underlying contents can be downloaded (e.g., in full) from content management system 110 on-demand.

The method shown in FIG. 4 is provided by way of example, as there are a variety of ways to carry out the method. Additionally, while the example method is illustrated with a particular order of blocks, those of ordinary skill in the art will appreciate that FIG. 4 and the blocks shown therein can be executed in any order that accomplishes the technical advantages of the present disclosure and can include fewer or more blocks than illustrated.

Each block shown in FIG. 4 represents one or more processes, methods, or subroutines, carried out in the example method. The blocks shown in FIG. 4 can be implemented in a system such as system 100 shown in FIG. 1 and client application 202 shown in FIGS. 2, 3A, and 3B. The flow chart illustrated in FIG. 4 is described in relation to and makes reference to at least the elements of system 100 shown in FIG. 1, and client application 202 shown in FIGS. 2, 3A, and 3B.

FIG. 4 shows a flow diagram of an example method 400 for generating a previous directory structure of content items stored at a content management system. Method 400 can begin at block 410. At block 410, the client application can receive a request for a previous version of a directory structure of a user account. For example, user 208 (e.g., User A) can enter and submit a date (e.g., Nov. 5, 2015) in go back pane 250. The request can include the date, along with identifying information of user 208 (e.g., user identifier, namespace identifier, etc.). In some examples, the request can include a specific directory for content items (e.g., sub-directory of top level directory shown in FIG. 3B).

At block 420, the client application can query for previous versions of the content items of the user account at the date provided. For example, client application 202 can send one or more requests to server file journal 148 of content management system 110 for one or more content items of the user account based on the date and identifying information from the request. Upon receiving the request, the server file journal can determine one or more content items that satisfy the date and identifying information from the request At block 430, the client application can receive indications of the content items of the user account 212 (of user 208) before the date provided (and shown as user account 340). For example, client application 202 can receive indications that folder 320 (e.g., Roo), folder 322 (e.g., Milo), image 328 (e.g., imogenjpg), and video 332 (e.g., Matrix.mp4) were content items stored in the top level directory of user account 340 (e.g., User A's CMS, user's namespace). In some examples, the indications can be information associated with the content items, but not the complete content item (e.g., filename, path, extension, metadata, unique identifier, etc.). In some examples, the indications can be lower than the top level directory (e.g., specific sub-directories indicated by the request).

At block 440, the client application can generate at least a portion of the previous version of the directory structure. For example, synchronization service 156 of client application 202 can generate placeholder content items based on the received indications. In some examples, synchronization service 156 can generate placeholder content items for one directory level (e.g., top level—as shown in FIG. 3A). In some examples, method 400 can be repeated when a folder (e.g., folder 322 Milo) is navigated to by the user, in order to generate placeholder content items of that directory (e.g., folder 334, text file 336). When a user wishes to accesses a file, which is represented by a placeholder content item associated with a file, the file can be retrieved (e.g., on-demand) from content management system 110. In other examples, synchronization service 156 can generate placeholder content items for the entire directory structure (e.g., User A's namespace at the content management system). In these other examples, a user can navigate the directory structure without the client application generating more placeholder content items from indications received from the content management system (unless the user attempts to access a file, which can be retrieved (e.g., on-demand) from the content management system 110).

In some examples, generating at least a portion of the previous version of the directory structure is operating system (or system) independent. For example, the previous version of the directory structure can be generated at a client device running Windows, Linux, Unix, OSx, etc.

Figure 5:
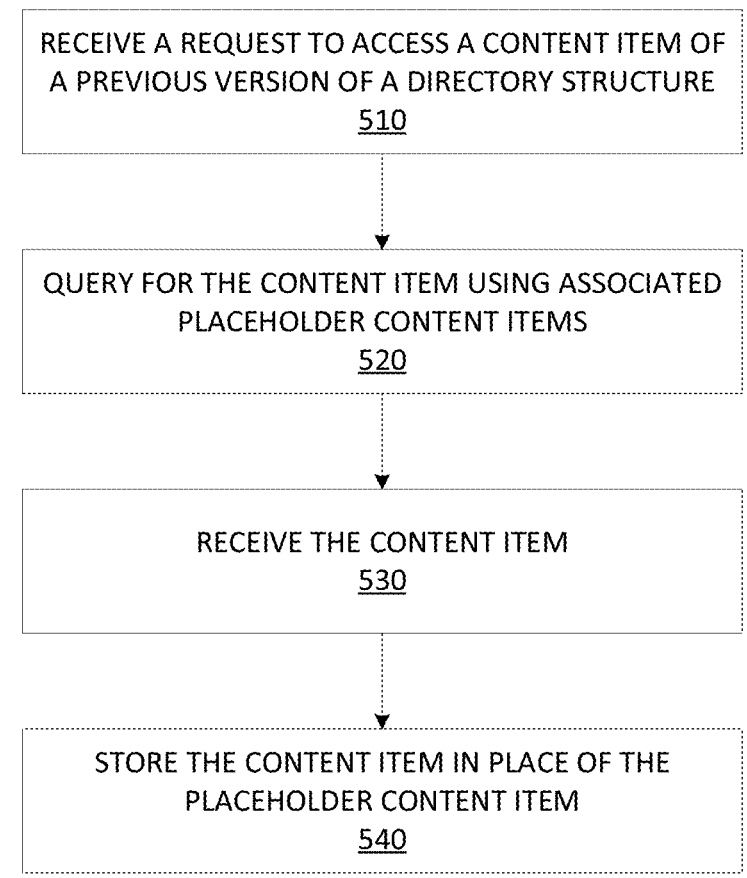
FIG. 5 shows a flow diagram of an example method for retrieving content items from a previous directory structure of content items stored at a content management system.

The method shown in FIG. 5 is provided by way of example, as there are a variety of ways to carry out the method. Additionally, while the example method is illustrated with a particular order of blocks, those of ordinary skill in the art will appreciate that FIG. 5 and the blocks shown therein can be executed in any order that accomplishes the technical advantages of the present disclosure and can include fewer or more blocks than illustrated.

Each block shown in FIG. 5 represents one or more processes, methods, or subroutines, carried out in the example method. The blocks shown in FIG. 5 can be implemented in a system such as system 100 shown in FIG. 1 and client application 202 shown in FIGS. 2, 3A, and 3B. The flow chart illustrated in FIG. 5 is described in relation to and makes reference to at least the elements of system 100 shown in FIG. 1 and client application 202 shown in FIGS. 2, 3A, and 3B.

FIG. 5 shows a flow diagram of an example method 500 for retrieving content items from a previous directory structure of content items stored at a content management system. Method 500 can begin at block 510. At block 510, the client application can receive a request to access a content item of a previous version of a directory structure (e.g., previous version of the directory structure of placeholder content items as shown in FIGS. 3A and 3B). For example, user 208 can request to access a placeholder content item of a previous version of the directory structure. From the user's perspective, the user is trying to access a content item (e.g., file, etc.) that appears to be locally available (e.g., the full content item, not a placeholder content item). In some examples, the request can be to open a content item and/or copy a content item. In some examples, the request can include an identifier of the content item (e.g., hash identifier).

At block 520, the client application can query the content storage of the content management system for the requested content item associated with the placeholder content item. For example, client application 202 can send one or more requests to content storage 142 of content management system 110 for the accessed content item using the identifier associated with the placeholder content item and the user identifier. At block 530, the client application can receive the queried content item.

At block 540, the client application can store the received content item in the previous version of the directory structure. In some examples, the stored content item can be stored as a read-only content item. When the content item is fully received, user 208 can view the content item, copy and paste (or drag and drop) the content item to another location, and/or save the content item to another location (e.g., other than the previous version of the directory structure) accessible by the client device (e.g., to make read/write). For example, the content item can be copied to user account 212 from previous version of user account 340 (e.g., previous version of the directory structure). In some examples, the client application can visually differentiate the content items from the placeholder content items (e.g., a checkmark can indicate a content item and a cloud or no symbol can indicate a placeholder content item). In some examples, a user can restore a file or directory. For example, a user can select a file or directory (e.g., placeholder content item) in the previous version of the directory structure (e.g., folder 322). After the selection the user can right-click to bring up a menu. The menu can include an option to restore the directory or file to the user account 212 (e.g., User A's CMS). In some examples, the restore can overwrite the current-in-time version of the file or directory. In other examples, the restore can write a new file or directory with a new name (e.g., Milo-11-05-2015). In other examples, the user can drag and drop the folder or file from the previous version of the directory structure (e.g., 340) to the current-in-time version of the directory structure (e.g., 212). In some examples, when the complete content item (e.g., folder, file, etc.) has not yet been downloaded (i.e., before the drag and drop operation) the drag and drop operation will trigger a download of the complete content item from the previous version of the directory structure and store the complete content item at the dropped location (e.g., the current-in-time version of the directory structure, another location on the user's Desktop, etc.).

Figure 6:
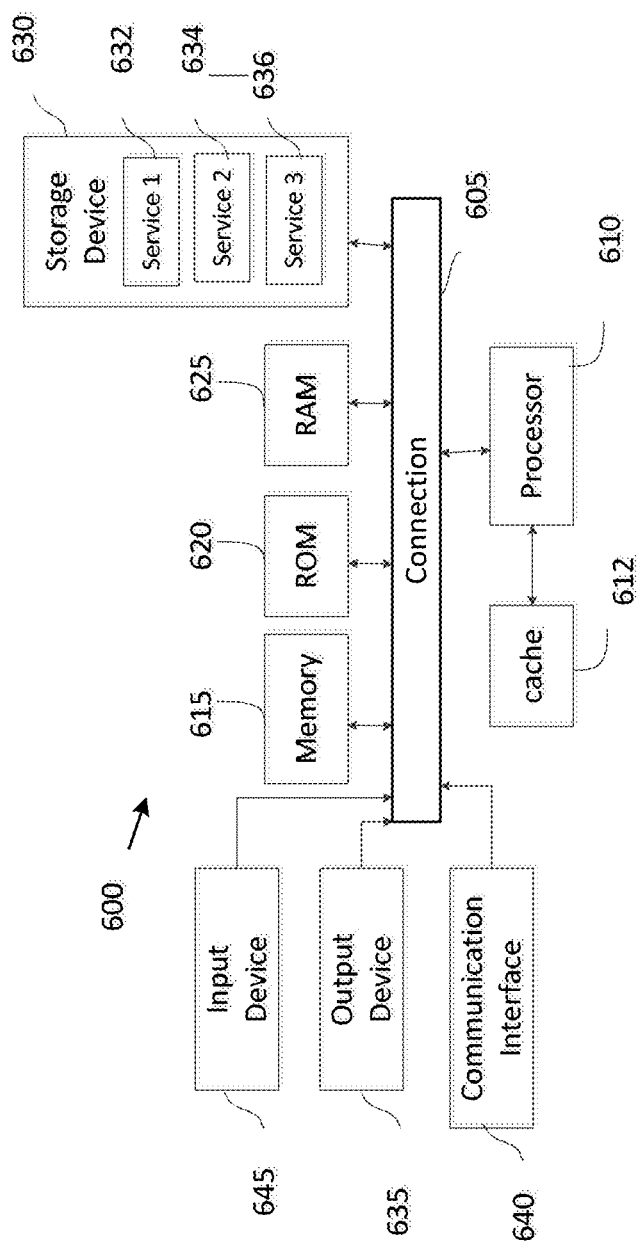
FIG. 6 shows an example of a system for implementing certain aspects of the present technology.

FIG. 6 shows an example of computing system 600 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) and random access memory (RAM) to processor 610. Computing system 600 can include a cache of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. Moreover, claim language reciting "at least one of" an element and another element refers to any possible permutation of the set of elements. For example, claim language reciting "at least one of A and B" or "at least one of A or B" means A, B, or both A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for visually presenting a previous version of a directory structure at a client device, the method comprising:
   receiving a request to visually present a previous version of a directory structure at a GUI of the client device, wherein the previous version of the directory structure is associated with a previous date;
   querying a content management system for content items contained in the previous version of the directory structure at the previous date;
   receiving, from the content management system, one or more indications of content items contained in the previous version of the directory structure at the previous date;
   presenting, at the GUI of the client device, a visual representational rendering of at least a portion of the previous version of the directory structure based on the one or more indications of the content items, wherein the visual representational rendering of at least the portion of the previous version of the directory structure includes placeholders representing the content items contained in the previous version of the directory structure at the previous date, and wherein the visual representational rendering of at least the portion of the previous version of the directory structure is separate from a current version of the directory structure associated with a current date;
   receiving, at the client device, a further request to access a content item selected by a user and having a corresponding placeholder in the visual representational rendering of at least the portion of the previous version of the directory structure;
   querying the content management system for the content item using the corresponding placeholder associated with the content item;
   receiving, from the content management system, the content item;
   updating the visual representational rendering of at least the portion of the previous version of the directory structure to replace the corresponding placeholder with the content item, wherein the updated visual representational rendering visually differentiates the content item from remaining placeholders based on one or more visual attributes, the one or more visual attributes indicating that the content item is a downloaded content item and the remaining placeholders are representations of corresponding content items; and
   moving, based on a user input, the content item from the previous version of the directory structure to the current version of the directory structure.

2. The method of claim 1, wherein the further request to access the content item comprises navigating to the corresponding placeholder in the visual representational rendering of at least the portion of the previous version of the directory structure.

3. The method of claim 1, wherein the further request to access the content item comprises navigating to a parent content item in the visual representational rendering of at least the portion of the previous version of the directory structure.

4. The method of claim 1, further comprising copying the content item from the visual representational rendering of at least the portion of the previous version of the directory structure to another directory structure.

5. The method of claim 1, further comprising:
   receiving, at the client device, an additional request to access an additional content item stored inside a parent content item contained in the visual representational rendering of the previous version of the directory structure, wherein the visual representational rendering of at least the portion of the previous version of the directory structure does not include a respective placeholder associated with the additional content item;
   querying the content management system for the respective placeholder associated with the additional content item;

receiving, from the content management system, the respective placeholder; and generating, at the client device, a visual representational rendering of a previous version of a sub-directory structure associated with the parent content item, the sub-directory structure including the respective placeholder associated with the additional content item, wherein the previous version of the sub-directory structure is associated with the previous date.

6. The method of claim 1, wherein the placeholders comprise metadata for locating the content items in storage at the content management system, the method further comprising overwriting a current version of the content item in the current version of the directory structure with the content item from the previous version of the directory structure.

7. The method of claim 1, further comprising:
receiving an input to navigate from a first location within the visual representational rendering of at least the portion of the previous version of the directory structure to a second location within the visual representational rendering of at least the portion of the previous version of the directory structure, wherein the second location corresponds to a parent node in the previous version of the directory structure;
receiving an indication of an additional content item contained within the parent node in the previous version of the directory structure; and
populating the visual representational rendering with at least one of the additional content item contained within the parent node or an additional placeholder representing the additional content item.

8. A non-transitory computer-readable medium storing instructions which, when executed by at least one processor, cause the at least one processor to:
receive a request for a previous version of a directory structure at a GUI of a device, wherein the previous version of the directory structure is associated with a previous date;
query a content management system for content items contained in the previous version of the directory structure at the previous date;
receive, from the content management system, one or more indications of content items contained in the previous version of the directory structure at the previous date;
generate, at the GUI of the device, a visual representational rendering of at least a portion of the previous version of the directory structure based on the one or more indications of the content items, wherein the visual representational rendering of at least the portion of the previous version of the directory structure includes placeholders representing the content items contained in the previous version of the directory structure at the previous date, and wherein the visual representational rendering of at least the portion of the previous version of the directory structure is separate from a current version of the directory structure associated with a current date;
receive a further request to access a content item selected by a user and having a corresponding placeholder in the visual representational rendering of at least the portion of the previous version of the directory structure;
query the content management system for the content item using the corresponding placeholder associated with the content item;
receive, from the content management system, the content item; and
update the visual representational rendering of at least the portion of the previous version of the directory structure to replace the corresponding placeholder with the content item, wherein the updated visual representational rendering visually differentiates the content item from remaining placeholders based on one or more visual attributes, the one or more visual attributes indicating that the content item is a downloaded content item and the remaining placeholders are representations of corresponding content items; and
move, based on a user input, the content item from the previous version of the directory structure to the current version of the directory structure.

9. The non-transitory computer-readable medium of claim 8, wherein the further request to access the content item comprises navigating to the corresponding placeholder in the visual representational rendering of at least the portion of the previous version of the directory structure.

10. The non-transitory computer-readable medium of claim 8, wherein the further request to access the content item comprises viewing the content item from the visual representational rendering of at least the portion of the previous version of the directory structure.

11. The non-transitory computer-readable medium of claim 8, further comprising instructions which, when executed by the at least one processor, cause the at least one processor to copy the content item from the visual representational rendering of at least the portion of the previous version of the directory structure to another directory structure.

12. The non-transitory computer-readable medium of claim 8, further comprising instructions which, when executed by the at least one processor, cause the at least one processor to:
receive an additional request to access an additional content item stored inside a parent content item contained in the visual representational rendering of the previous version of the directory structure, wherein the visual representational rendering of at least the portion of the previous version of the directory structure does not include a respective placeholder associated with the additional content item;
query the content management system for the respective placeholder associated with the additional content item;
receive, from the content management system, the respective placeholder; and
generate a visual representational rendering of a previous version of a sub-directory structure associated with the parent content item, the sub-directory structure including the respective placeholder associated with the additional content item, wherein the previous version of the sub-directory structure is associated with the previous date.

13. The non-transitory computer-readable medium of claim 8, wherein the placeholders comprise metadata for locating the content items.

14. The non-transitory computer-readable medium of claim 8, further comprising instructions which, when executed by the at least one processor, cause the at least one processor to:
receive an input to navigate from a first location within the visual representational rendering of at least the portion of the previous version of the directory structure to a second location within the visual representational rendering of at least the portion of the previous version of the directory structure, wherein the second location corresponds to a parent node in the previous version of the directory structure;

receive an indication of an additional content item contained within the parent node in the previous version of the directory structure; and populate the visual representational rendering with at least one of the additional content item contained within the parent node or an additional placeholder representing the additional content item.

15. A client device comprising:

at least one processor; and a memory comprising instructions which, when executed by the at least one processor, cause the at least one processor to:

receive a request for a previous version of a directory structure at a GUI of a device, wherein the previous version of the directory structure is associated with a previous date;

query a content management system for content items contained in the previous version of the directory structure at the previous date;

receive, from the content management system, one or more indications of content items contained in the previous version of the directory structure at the previous date;

generate, at the GUI of the device, a visual representational rendering of at least a portion of the previous version of the directory structure based on the one or more indications of the content items, wherein the visual representational rendering of at least the portion of the previous version of the directory structure includes placeholders representing the content items contained in the previous version of the directory structure before the previous date, and wherein the visual representational rendering of at least the portion of the previous version of the directory structure is separate from a current version of the directory structure associated with a current date;

receive a further request to access a content item having a corresponding placeholder in the visual representational rendering of at least the portion of the previous version of the directory structure;

query the content management system for the content item using the corresponding placeholder associated with the content item;

receive, from the content management system, the content item; and update the visual representational rendering of at least the portion of the previous version of the directory structure to replace the corresponding placeholder with the content item, wherein the updated visual representational rendering visually differentiates the content item from remaining placeholders based on one or more visual attributes, the one or more visual attributes indicating that the content item is a downloaded content item and the remaining placeholders are representations of corresponding content items; and move, based on a user input, the content item from the previous version of the directory structure to the current version of the directory structure.

16. The client device of 15, wherein the further request to access the content item comprises navigating to the corresponding placeholder in the visual representational rendering of at least the portion of the previous version of the directory structure.

17. The client device of claim 15, wherein the further request to access the content item comprises navigating to a parent content item in the visual representational rendering of at least the portion of the previous version of the directory structure.

18. The client device of claim 16, the memory comprising instructions which, when executed by the at least one processor, cause the at least one processor to copy the content item from the visual representational rendering of at least the portion of the previous version of the directory structure to another directory structure.

19. The client device of claim 15, the memory comprising instructions which, when executed by the at least one processor, cause the at least one processor to:

receive an additional request to access an additional content item stored inside a parent content item contained in the visual representational rendering of the previous version of the directory structure, wherein the visual representational rendering of at least the portion of the previous version of the directory structure does not include a respective placeholder associated with the additional content item;

query the content management system for the respective placeholder associated with the additional content item;

receive, from the content management system, the respective placeholder; and generate a visual representational rendering of a previous version of a sub-directory structure associated with the parent content item, the sub-directory structure including the respective placeholder associated with the additional content item, wherein the previous version of the sub-directory structure is associated with the previous date.

20. The client device of claim 15, the memory comprising instructions which, when executed by the at least one processor, cause the at least one processor to:

receive an input to navigate from a first location within the visual representational rendering of at least the portion of the previous version of the directory structure to a second location within the visual representational rendering of at least the portion of the previous version of the directory structure, wherein the second location corresponds to a parent node in the previous version of the directory structure;

receive an indication of an additional content item contained within the parent node in the previous version of the directory structure; and populate the visual representational rendering with at least one of the additional content item contained within the parent node or an additional placeholder representing the additional content item.

* * * * *